United States Patent [19]

Von Der Eltz et al.

[11] Patent Number: 5,690,698

[45] Date of Patent: Nov. 25, 1997

[54] BLACK DYE MIXTURES OF FIBER-REACTIVE AZO DYES AND THEIR USE FOR DYEING HYDROXYL- AND/OR CARBOXAMIDO-CONTAINING FIBER MATERIAL

[75] Inventors: Andreas Von Der Eltz, Frankfurt am Main; Werner Hubert Russ, Flörsheim; Dirk Buchwald, Selters, all of Germany

[73] Assignee: Hoechst Aktiengesellschaft, Germany

[21] Appl. No.: 611,630

[22] Filed: Mar. 6, 1996

[30] Foreign Application Priority Data

Mar. 8, 1995 [DE] Germany ............ 195 08 156.0

[51] Int. Cl.⁶ ............ C09B 67/22; D06P 1/38; D06P 3/10; D06P 3/66
[52] U.S. Cl. ............ 8/532; 8/546; 8/549; 8/641; 8/682; 8/687; 8/918; 8/921
[58] Field of Search ............ 8/546, 549, 641, 8/527, 532

[56] References Cited

FOREIGN PATENT DOCUMENTS

| 4414320 | 10/1995 | Germany. |
| 2-73870 | 3/1990 | Japan. |
| 2-202956 | 8/1990 | Japan. |
| 91-2676 | 5/1991 | Rep. of Korea. |
| 91-6386 | 8/1991 | Rep. of Korea. |
| 91-8343 | 10/1991 | Rep. of Korea. |

*Primary Examiner*—Margaret Einsmann
*Attorney, Agent, or Firm*—Connolly and Hutz

[57] ABSTRACT

A dye mixture of azo dyes having fiber-reactive groups of the vinylsulfone series, comprising one or more navy-blue disazo dyes with the bivalent 1-amino-8-hydroxy-3,6-disulfo-naphthylene coupling component, one or more red-dyeing mono azo dyes, containing a phenylamino-chlorotriazinylamino-disulfo-naphthol-coupling component and one or more orange-dyeing monoazo dyestuffs with an amino-sulfonaphthol-coupling component, which dye mixtures are suitable for dyeing hydroxy- and/or carboxamido-groups containing materials, in particular fiber materials, such as cellulose fibers, for example cotton, wool and synthetic polyamide fibers.

11 Claims, No Drawings

BLACK DYE MIXTURES OF FIBER-REACTIVE AZO DYES AND THEIR USE FOR DYEING HYDROXYL- AND/OR CARBOXAMIDO-CONTAINING FIBER MATERIAL

DESCRIPTION

Black dye mixtures of fiber-reactive azo dyes and their use for dyeing hydroxyl- and/or carboxamido-containing fiber material.

The invention is in the technical field of fiber-reactive dyes.

The efforts at widening or supplementing the ranges of dyes by means of modern reactive dyes, reach, in many respects, limits which can be overcome only insufficiently, if at all, by means of an individual dye component. A particularly critical aspect is the synthesis of metal-complex-free deep black dyes. The best known black reactive dye is the one which in the Color Index is named Reactive Black 5, a disazo dye containing 3,6-disulfo-1-amino-8-naphthol as bivalent coupling component and 4-(β-sulfoethylsulfonyl) aniline as the two diazo components; however, the shade obtained with this dye is rather a dull navy. To obtain deep black dyeings with this dye, it must be blended (shaded) with small amounts of orange- or red-dyeing, but more advantageously, yellow- and red-dyeing dyes. These adjustments may also take into account any problems caused by metamerism (different shades in artificial light).

It is true that Japanese Published Patent Applications Hei-2-073,870 and Hei-2-202,956 and Korean Patents 91/2, 676, 91/6,386 and 91/8,343 already disclose dye mixtures which are suitable for producing deep black dyeings on cellulose fiber materials. However, these known dye mixtures suffer from certain drawbacks in practical application; thus, in particular their ability of being washed out and their wet storage fastness are in need of improvement.

The present invention provides dye mixtures which are advantageous in this respect and comprise one or more, such as 2, 3 or 4, disazo dyes of the formula (1), one or more, such as 2, 3 or 4, monoazo dyes of the formula (3), one or more, such as 2 or 3, monoazo dyes of the formula (4), if desired one or two monoazo dyes of the formula (2), and, if desired, one or more, such as 2 or 3, monoazo dyes of the formula (5).

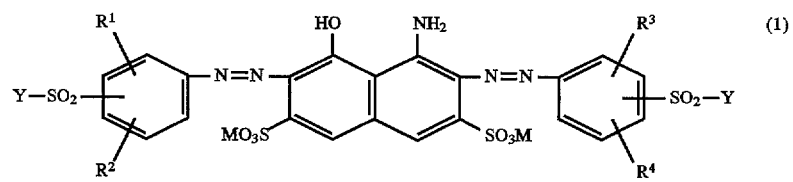

(1)

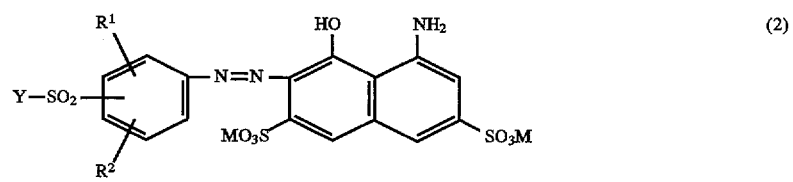

(2)

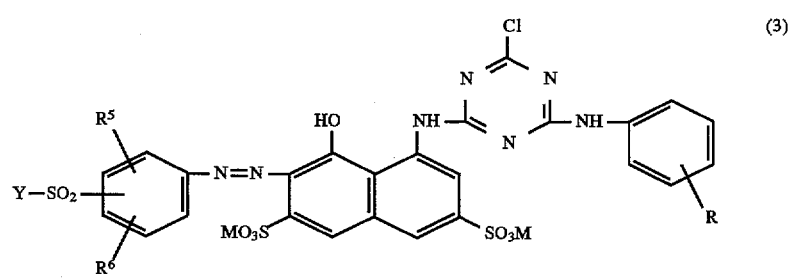

(3)

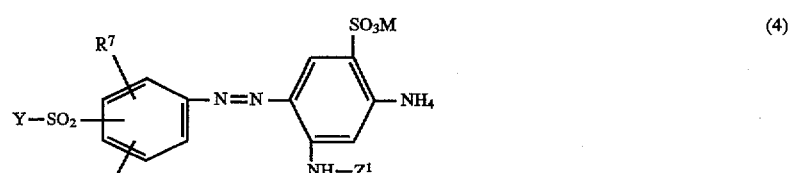

(4)

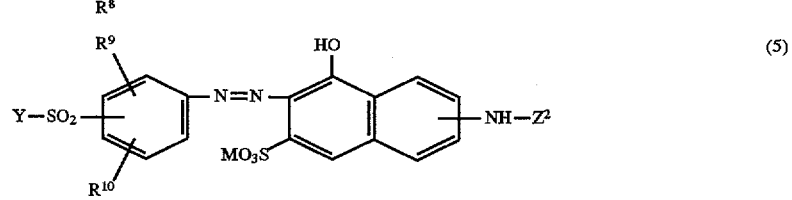

(5)

In these formulae,

M is hydrogen or an alkali metal, such as lithium, sodium and potassium, $R^1$ is hydrogen, methyl, ethyl, methoxy or ethoxy, preferably methoxy and hydrogen, and in particular hydrogen, $R^2$ is hydrogen, methyl, ethyl, methoxy or ethoxy, preferably hydrogen, $R^3$ is hydrogen, methyl, ethyl, methoxy or ethoxy, preferably methoxy and hydrogen, and in particular hydrogen, $R^4$ is hydrogen, methyl, ethyl, methoxy or ethoxy, preferably hydrogen, $R^5$ is hydrogen, methyl, ethyl, methoxy or ethoxy, preferably methoxy and hydrogen, and in particular hydrogen, $R^6$ is hydrogen, methyl, ethyl, methoxy or ethoxy, preferably hydrogen, $R^7$ is hydrogen, methyl, ethyl, methoxy or ethoxy, preferably methoxy and hydrogen, and in particular hydrogen, $R^8$ is hydrogen, methyl, ethyl, methoxy or ethoxy, preferably hydrogen, $R^9$ is hydrogen, methyl, ethyl, methoxy or ethoxy, preferably methoxy and hydrogen, and in particular hydrogen, $R^{10}$ is hydrogen, methyl, ethyl, methoxy or ethoxy, preferably hydrogen, each Y, independently of the others, is vinyl, β-chloroethyl, β-thiosulfatoethyl or β-sulfatoethyl, R is hydrogen, methyl, sulfo, carboxyl or a group of the formula
—$SO_2$—Y where Y has one of the meanings given above, $Z^1$ is alkanoyl of 2 to 5 carbon atoms, such as propionyl and acetyl, or is benzoyl or is 2,4-dichloro-1,3,5-triazin-6-yl or is a group of the formula (a)

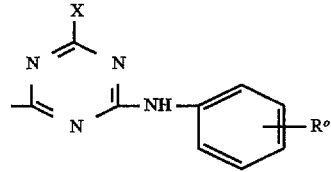

in which

X is chlorine or cyanamino and $R^o$ is sulfo, carboxyl or a group of the formula —$SO_2$—Y where Y has one of the meanings given above, $Z^2$ has one of the meanings of $Z^1$, and the group —NH—$Z^2$ in formula 5 is attached to the 6-sulfo-8-hydroxynaphth-2-yl radical in the 2 or 3 position.

The individual formula members in formulae (1), (2), (3), (4) und (5) can, within their definition, have meanings which are identical to or different from one another.

A sulfo group is a group of the formula —$SO_3M$, a carboxyl group is a group of the formula —COOM, a sulfato group is a group of the formula —$OSO_3M$, and a thiosulfato group is a group of the formula —S—$SO_3M$ where M has in each case the meaning given above.

The dyes of the formulae (1) to (5) are disclosed, for example, in German Patents 960,534 and 965,902 and U.S. Pat. No. 4,257,770 and in European Patents 0,032,187, 0,094,055, 0,073,481 and 0,061,151 and can be prepared analogously to the procedures described there.

The groups Y—$SO_2$— are preferably attached to the benzene moiety in the meta or para position relative to the azo groups or amino groups. Y—$SO_2$— is preferably vinylsulfonyl and particularly preferably β-sulfatoethylsulfonyl.

In formula (3), R is preferably a group of the formula —$SO_2$—Y und particularly preferably sulfo. In formulae (4) and (5), $Z^1$ and $Z^2$ are preferably acetyl. If more than one monoazo dye of the formula (3) are present in the dye mixtures according to the application, they are preferably dyes of the formula (3) in which the groups Y—$SO_2$— are vinylsulfonyl and β-sulfatoethylsulfonyl and R is sulfo or they are preferably dye mixtures of monoazo dyes of the formula (3) in which the groups R are sulfo and groups of the formula —$SO_2$—Y where the radicals Y in formula (3) are vinyl and β-sulfatoethylsulfonyl.

In general, the azo dyes of the formulae (1), (2), (3), (4) and (5) are present in the mixture according to the invention in a molar mixing ratio of 10:1.3:1.8:8.6:1.2 to 10:0:0.8:3.5:0, preferably in a molar mixing ratio of 10:1.25:1.55:7.4:0.95 to 10:0:1.05:5.0:0.

If two or more dyes of the formula (3) in which in one or two of the dyes the radical R is sulfo and in the other dye(s) the radical R is a group of the formula —$SO_2$—Y are present in the dye mixtures according to the invention, the dye(s) of the formula (3) where R is sulfo and the dye(s) of the formula (3) where R is —$SO_2$—Y are preferably present in a molar mixing ratio of 1:1.6 to 1:0.4, in particular of 1:1.2 to 1:0.8, relative to one another.

Examples of radicals of diazo components in formulae (1) to (5) and phenyl substituted by a radical R or $R^o$ in formulae (3) and (5) are 3-(β-sulfatoethylsulfonyl)phenyl, 4-(β-sulfatoethylsulfonyl)phenyl, 2-methyl-5-methoxy-4-(β-sulfatoethylsulfonyl)phenyl, 2-methoxy-5-(β-sulfatoethylsulfonyl)phenyl and 2,5-dimethoxy-4-(β-sulfatoethylsulfonyl)phenyl and their vinylsulfonyl, β-chloroethylsulfonyl and β-thiosulfatoethylsulfonyl derivatives and 3-sulfophenyl and 4-sulfophenyl, of these preferably 2-methoxy-5-(β-sulfatoethylsulfonyl)phenyl and 2,5-di-methoxy-4-(β-sulfatoethylsulfonyl)phenyl and in particular 3-(β-sulfatoethylsulfonyl)phenyl and 4-(β-sulfatoethylsulfonyl)phenyl and 3-sulfophenyl.

The dyes of the formulae (1) to (5), in particular those containing the same chromophore, can, within the meaning of Y, carry different fiber-reactive groups —$SO_2$—Y. The dye mixtures can in particular contain dyes having the same chromophore in which the fiber-reactive groups —$SO_2$—Y are, on the one hand, vinylsulfonyl groups and, on the other, β-chloroethylsulfonyl or β-thiosulfatoethylsulfonyl or preferably β-sulfatoethylsulfonyl groups. If the dye mixtures contain the corresponding dye components in the form of a vinylsulfonyl dye, the proportion of the corresponding vinylsulfonyl dye, relative to the corresponding β-chloro- or β-thiosulfato- or β-sulfatoethylsulfonyl dye, is preferably up to about 10 mole %, based on the corresponding dye chromophore. Of these, preference is given to those dye mixtures in which the molar ratio of the amount of vinylsulfonyl dyes to that of β-sulfatoethylsulfonyl dyes is between 2:98 and 10:90.

The dye mixtures according to the invention can be present as a preparation in solid or in liquid (dissolved) form. In solid form, they usually contain the electrolyte salts customary in water-soluble and in particular fiber-reactive dyes, such as sodium chloride, potassium chloride and sodium sulfate, and can moreover contain the auxiliaries customary in commercial dyes, such as buffer substances which are capable of adjusting the pH in aqueous solution to a value between 3 and 7, such as sodium acetate, sodium borate, sodium bicarbonate, sodium dihydrogen phosphate and disodium hydrogen phosphate, small amounts of siccatives or solubility-improving agents, such as the known condensation products of naphthalenesulfonic acid and formaldehyde, or, if they are present in liquid, aqueous solution (including the content of thickeners such as are customary in printing pastes), substances ensuring the durability of these preparations, such as, for example, mold-preventing agents.

In general, the dye mixtures according to the invention are present in the form of a dye powder containing electrolyte salt and having a total dye content of 20 to 70% by weight, relative to the dye powder or the preparation. In addition, these dye powders/preparations can additionally contain the buffer substances mentioned in a total amount of up to 5% by weight, relative to the dye powder. If the dye mixtures according to the invention are present in an aqueous solution, the total dye content is up to 50% by weight, such as, for example, between 5 and 40% by weight, the electrolyte salt content in these aqueous solutions being preferably below 10% by weight, relative to the aqueous solution. The aqueous solutions (liquid preparations) can in general contain the buffer substances mentioned in an amount of up to 5% by weight, preferably of up to 2% by weight.

The dye mixtures according to the invention can be prepared in the usual manner, for example by mechanical mixing of the individual dyes or of mixtures of 2 or 3 of such individual dyes with the other individual dyes in the form of their dye powders or aqueous solutions. If the dye mixtures according to the invention are prepared by mechanical mixing of the individual dyes, any standardizing agents, dustproofing agents or further auxiliaries which may be necessary for mixing and are customary in dyeing technology and customary in dye preparations used for this purpose are added.

When starting from aqueous dye solutions of the individual components (individual dyes) or, if desired, from dye solutions already containing two or more of these individual components, the desired dye mixture is also obtained in aqueous form (liquid preparation) by simple mixing, taking into account the amounts of dye solutions and their dye concentrations. Such aqueous dye solutions of the individual components or mixtures of such individual components can also be synthesis solutions obtainable from the synthesis of the individual components or, if synthetically feasible, from the synthesis of mixtures of individual dyes. The aqueous solutions containing the dye mixtures according to the invention thus obtained by mixing the individual dye solutions (synthesis solutions) can then be used directly, if desired after filtration, concentration and/or addition of a buffer or other auxiliaries, for dyeing in the form of a liquid preparation. However, these dye solutions can also be converted into the pulverulent and granular dye mixtures according to the invention having the desired composition and modification for example by spray-drying and, if required, in a fluidized bed.

However, in order to obtain desirable dye mixing ratios and hues, the aqueous dye solutions according to the invention containing the dye mixtures according to the invention can particularly advantageously be subjected to mixing according to the invention by controlling the hue of the mixture during addition of the components (of the dye solutions) by means of an ATR probe. This is done by a multi-component analysis using UV-VIS spectra. By means of this analysis, first the exact amounts and dye concentrations of the individual components (individual dyes) present in the aqueous starting solutions are determined, and the individual components are then mixed in the required amounts by means of an ATR probe, the mixing process being monitored by means of a control process. The procedure is based on recording UV-VIS spectra using a photo-diode spectrometer (see EP-A-0,385,587) or a fast-scanning grating spectrometer, followed by multi-component analysis, which, after calibration with the pure individual dyes or mixtures of such dyes or aqueous solutions thereof, provides exact data on the amounts and concentrations of dye in the solutions by separating the mixtures mathematically into the individual components. At every moment, the actual content of the dyes can be read from a monitor. Owing to its high resolution, the measuring instrument can detect even minimal absorption shoulders, which can be used for distinguishing the individual dyes unequivocally from one another.

It has proven advantageous to obtain calibration series of the dyes to be determined by measuring the pure dyes prior to starting the actual experiment. As for the calibration measurements, they may cover not only individual components but also mixtures of a plurality of components. The exact concentrations are entered into the computer program separately for each dye. The concentration range of the calibration solutions should include the measuring range. These data are used for calculating a calibration matrix which is necessary for the later determination of the dye components. As used here, multi-component analysis is understood to mean quantitative analysis of dye mixtures which makes use of the following mathematical algorithms: Partial Least Squares Type 1 (PLS-1), Partial Least Squares Type 2 (PLS-2), Methods of Least Squares, Principle Component Regression Analysis (PCR) and Classic Least Squares (CLS) or Inverse Least Squares (ILS). The Method of Least Squares (PLS) and the Principle Component Regression (PCR) are described, for example, by D. Haaland and E. V. Thomas in Anal. Chem. 1988, 60, 1193, Anal. Chem. 1988, 60, 1202 and Anal. Chem. 1990, 62, 1091 and by P. Geladi and B. Kowalewski in A. Tutorial, Laboratory for Chemometrics and Center for Process Analytical Chemistry, Dept. of Chemistry, University of Washington, Seattle, Wash. 98195. The aim of these approaches by calculation is to obtain mathematical equations which allow the determination of the content of unknown mixtures. The principle of the PLS algorithm is to separate the available spectra into a series of mathematical spectra which are described in the form of factors. A detailed description of the procedure is available from the literature mentioned.

Via an inlet and an outlet, the individual dye solutions are pumped through a flow-through cell. The cell diameter can be as small as 0.01 cm to enable also highly concentrated solutions to be measured. The cell is placed in a UV-VIS spectrometer which is either a diode line spectrometer or a fast-scanning grating spectrometer. Dye solutions of individual components (individual dyes) can be measured directly by spectroscopy. For dye mixtures which can be analyzed directly without an intermediate concentrating step, the ATR (Attenuated Total Reflection) measuring method can be used. In this method, a quartz or alkali glass rod or a light-transporting device suitable for this purpose is dipped into the solution to be measured and the measurements are carried out at the interface between crystal and liquid. The samples typically used for this have a concentration of 5 to 150 g/l of dye. The ATR probe is connected to the spectrometer via a glass fiber waveguide. For measurements in the VIS region, the length of the waveguide can be up to 1000 m, which is why the spectrometer can be placed centrally in a measuring station. Thus, in explosion-proof plants, no further precautions must be taken.

In order to adjust an aqueous solution according to the invention comprising the dye mixture to a certain dye content and a certain dye composition of the mixture, the target mixture must be measured and its color coordinates and composition in percent be determined. During adjustment and metered addition of the individual components, these data serve as target parameter as a function of which the color difference and the individual concentrations are calculated and plotted in a graph. The dyes necessary for this as components of the mixture are then added to an already introduced dye of the mixture according to the invention, such as, for example, the quantitatively major component of the dyes of the formula (1), over a sufficiently long period to reach the target concentration and the target hue.

The dye mixtures according to the invention produce deep black dyeings exhibiting good color build-up and, in particular, good ability of unfixed portions of dye being washed out of the dyed material on hydroxyl- and/or carboxamido-containing fiber materials by the application and fixation methods extensively described in the art of fiber-reactive dyes.

Accordingly, the present invention also relates to the use of the dye mixtures according to the invention for dyeing (including printing) hydroxyl- and/or carboxamido-containing fiber materials and to processes for dyeing such fiber materials with a dye mixture according to the invention by applying the dye mixture in dissolved form to the substrate and fixing the dyes on the fiber by reaction with an alkaline agent or by means of heat or by both measures.

Hydroxyl-containing materials are natural or synthetic hydroxyl-containing materials, such as, for example, cellulose materials, which may also be in the form of paper, or regenerated products thereof and polyvinyl alcohols. Cellulose fiber materials are preferably cotton, but also other vegetable fibers, such as linen, hemp, jute and ramie fibers. Examples of regenerated cellulose fibers are staple viscose and filament viscose.

Examples of carboxamido-containing materials are synthetic and natural polyamides and polyurethanes, in particular in the form of fibers, for example wool and other animal hair, silk, leather, nylon 6/6, nylon 6, nylon 11 and nylon 4.

The dye mixtures according to the invention are applied by generally known methods for the dyeing and printing of fiber materials in accordance with the known application methods for fiber-reactive dyes. Since the dyes of the dye mixtures according to the invention are highly compatible with one another, the dye mixtures according to the invention can also be used advantageously in exhaust dyeing methods. Accordingly, they produce dyeings in very high color yields in combination with excellent color build-up and constant hues, for example on cellulose fibers, by the exhaust method from a long liquor at temperatures between 40° and 105° C., if desired at temperatures of up to 130° C. under pressure, and, if desired, in the presence of customary dyeing assistants using acid scavengers and, if desired, neutral salts, such as sodium chloride or sodium sulfate. The procedure can be such that the warm bath is entered with the material and then gradually heated to desired dyeing temperature, and the dyeing process is completed at this temperature. If desired, addition to the bath of the neutral salts which accelerate exhaustion of the dyes can also be delayed until the actual dyeing temperature is reached.

Likewise, the customary printing methods for cellulose fibers, which can either be carried out in a single phase, for example by printing with a printing paste containing sodium carbonate or a different acid scavenger and the colorant, followed by steaming at 100° to 103° C., or in two phases, for example by printing with a neutral or weakly acidic printing paste containing the colorant, followed by fixing which is effected either by passing the printed goods through a hot electrolyte-containing alkaline bath or by overpadding with an alkaline electrolyte-containing padding liquor, followed by storing the treated material or by steaming or by a treatment with dry heat, produce strong prints having crimp contours and a clear white ground. Varying fixation conditions have only a minor effect on how the prints turn out. Not only in the dyehouses but also in the printing plants, the degrees of fixation obtained with the dye mixtures according to the invention are very high. When fixing is carried out by means of dry heat using the customary dry heat setting methods, hot air at 120° to 200° C. is used. Apart from the customary steam at 101° to 103° C., superheated steam and pressurized steam having temperatures of up to 160° C. can also be used.

Examples of the agents acting as acid scavengers and resulting in fixation of the dyes on the cellulose fibers are water-soluble basic alkali metal salts and alkaline earth metal salts of inorganic or organic acids and compounds releasing alkali in the heat. They include in particular alkali metal hydroxides and alkali metal salts of weak to medium-strong inorganic or organic acids, alkali metal compounds being preferably sodium compounds and potassium compounds. Examples of such acid scavengers are sodium hydroxide, potassium hydroxide, sodium carbonate, sodium bicarbonate, potassium carbonate, sodium formate, sodium dihydrogen phosphate and disodium hydrogen phosphate.

Treatment of the dyes of the dye mixtures according to the invention with acid scavengers, if appropriate with the application of heat, results in chemical bonding of the dyes to the cellulose fiber. In particular cellulose dyeings exhibit, after customary after treatment by rinsing to remove unfixed portions of dye, excellent wet fastness properties, especially since unfixed portions of dye can be easily washed out owing to their good cold water solubility.

The dyeings on polyurethane and polyamide fibers are usually carried out from an acid medium. Thus, to obtain the desired pH, it is possible to add, for example, acetic acid and/or ammonium sulfate and/or acetic acid and ammonium acetate or sodium acetate to the dyeing bath. To achieve a useful levelness of the dyeing, it is recommended to add customary leveling agents, such as, for example, those based on an adduct of cyanuric chloride and 3 times the molar amount of an aminobenzenesulfonic acid or aminonaphthalenesulfonic acid or those based, for example, on an adduct of stearylamine and ethylene oxide. Typically, the material to be dyed is introduced into the bath at a temperature of about 40° C., agitated therein for some time, the dyeing bath is then readjusted to the desired weakly acidic, preferably weakly acetic acid, pH, and the actual dyeing is then carried out at a temperature between 60° and 98° C. However, the dyeings can also be carried out at the boiling temperature or at temperatures of up to 120° C. (under presssure).

The examples below serve to illustrate the invention. Parts and percentages are by weight, unless stated otherwise. Parts by weight relate to parts by volume as the kilogramm relates to the liter.

In the examples, the formulae of the dyes are given in the form of the free acid, and the parts given relate to the acid form. However, the dyes are usually used as an alkali metal salt powder containing electrolyte salts (for example containing sodium chloride or sodium sulfate) which is the form customary for water-soluble dyes. The amounts given are to be understood as exemplary and do not limit the possible production of different hues.

EXAMPLE 1

50 parts of an aqueous solution, such as, for example, an as-synthesized aqueous solution, containing 14 parts of the navy-dyeing disazo dye of the formula (A)

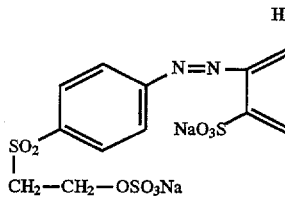
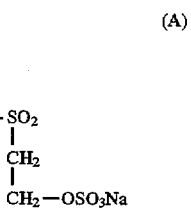

(A)

and 1 part of the red-dyeing monoazo dye of the formula (B)

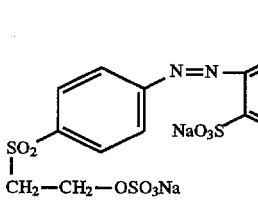

(B)

10 parts of an aqueous solution, such as, for example, an as-synthesized aqueous solution, containing 2 parts of the red monoazo dye of the formula (C)

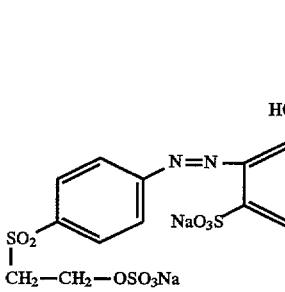

(C)

35 parts of an aqueous solution, such as, for example, an as-synthesized aqueous solution, containing 5 parts of the golden-yellow-dyeing monoazo dye of the formula (D)

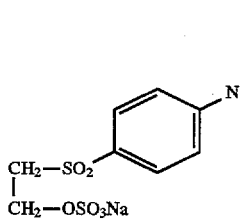

(D)

and 5 parts of an aqueous solution, such as, for example, an as-synthesized aqueous solution, containing 0.7 part of the orange-dyeing monoazo dye of the formula (E)

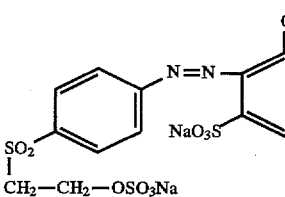

(E)

(where these solutions can additionally contain or additionally contain electrolyte salts, such as sodium chloride, or customary auxiliaries, such as, for example, buffers and surface-active agents) are mixed with one another.

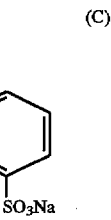

The resulting aqueous dye mixture according to the invention can be used directly for dyeing or be converted into solid form by spray-drying and, if desired, granulation. The dye mixture according to the invention produces deep black dyeings and prints exhibiting good ability of unfixed portions of dye being washed out and good wet storage fastness, the deep black color not showing any shading between daylight and artificial light, for example on cellulose fiber materials, by the application and fixation methods customary in the art of fiber-reactive dyes.

EXAMPLE 2

50 parts of an aqueous solution, such as, for example, an as-synthesized aqueous solution, containing 14 parts of the navy-dyeing disazo dye of the formula (A) and 1 part of the red-dyeing monoazo dye of the formula (B), 10 parts of an aqueous solution, such as, for example, an as-synthesized aqueous solution, containing 4 parts of the red monoazo dye of the formula (C), and 33.8 parts of an aqueous solution, such as, for example, an as-synthesized aqueous solution, containing 4.83 parts of the golden-yellow-dyeing monoazo dye of the formula (D) (where these solutions can additionally contain or additionally contain electrolyte salts, such as sodium chloride, or customary auxiliaries, such as, for example, buffers and surface-active agents) are mixed with one another using the analytical system explained in the general description section and the resulting control by pumps effecting metered addition of the dye solutions. The target parameters are the dye site and the individual dye concentrations of a conventionally prepared dye mixture according to the present invention defined by the colorist as desirable dye mixture. During addition of dyes (C) and (D) to the dye solution of dyes (A) and (B), the color difference and the concentration of the individual dyes of the dye mixture present are constantly shown on the monitor. Upon reaching the target values, addition of the dye solutions is stopped.

The resulting aqueous dye mixture according to the invention can be used directly for dyeing or be converted into solid form by spray-drying and, if desired, granulation.

11

The dye mixture according to the invention produces deep black dyeings and prints exhibiting good ability of unfixed portions of dye being washed out and good wet storage fastness, the deep black color not showing any shading between daylight and artificial light, for example on cellulose fiber materials, by the application and fixation methods customary in the art of fiber-reactive dyes.

EXAMPLE 3

The procedure of Example 1 or 2 is repeated, except that 50 parts of an aqueous solution, containing 14 parts of the dye of the formula (A) and 1 part of the dye of the formula (B), 10 parts of an aqueous solution containing parts of the dye of the formula (C), 5 parts of an aqueous solution containing 0.7 part of the dye of the formula (E) and 35 parts of an aqueous solution containing 6.9 parts of the dye of the formula (F)

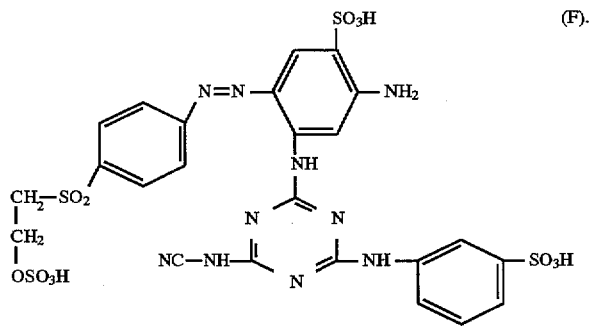

are used.

The resulting aqueous dye mixture according to the invention can be used directly for dyeing or be converted into solid form by spray-drying and, if desired, granulation. The dye mixture according to the invention produces deep black dyeings and prints exhibiting good ability of unfixed portions of dye being washed out and good wet storage fastness, the deep black color not showing any shading between daylight and artificial light, for example on cellulose fiber materials, by the application and fixation methods customary in the art of fiber-reactive dyes.

We claim:

1. A dye mixture comprising one or more disazo dyes of the formula (1), one or more monoazo dyes of the formula (3), one or more monoazo dyes of the formula (4), optionally one or two monoazo dyes of the formula (2), and, optionally, one or more monoazo dyes of the formula (5):

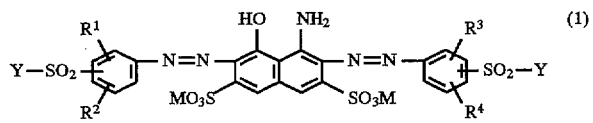

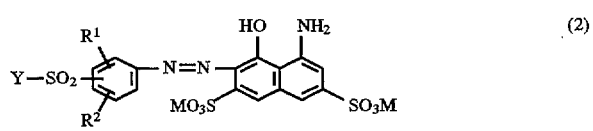

12

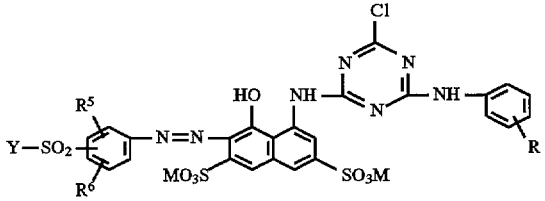

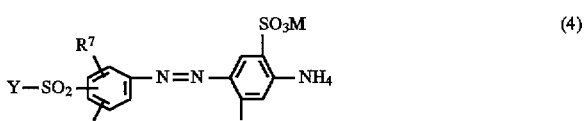

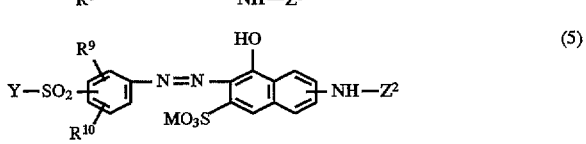

in which formulae

M is hydrogen or an alkali metal, $R^1$ is hydrogen, methyl, ethyl, methoxy or ethoxy,
$R^2$ is hydrogen, methyl, ethyl, methoxy or ethoxy,
$R^3$ is hydrogen, methyl, ethyl, methoxy or ethoxy,
$R^4$ is hydrogen, methyl, ethyl, methoxy or ethoxy,
$R^5$ is hydrogen, methyl, ethyl, methoxy or ethoxy,
$R^6$ is hydrogen, methyl, ethyl, methoxy or ethoxy,
$R^7$ is hydrogen, methyl, ethyl, methoxy or ethoxy,
$R^8$ is hydrogen, methyl, ethyl, methoxy or ethoxy,
$R^9$ is hydrogen, methyl, ethyl, methoxy or ethoxy,
$R^{10}$ is hydrogen, methyl, ethyl, methoxy or ethoxy, each Y, independently of the others, is vinyl, β-chloroethyl, β-thiosulfatoethyl or β-sulfatoethyl, R is hydrogen, methyl, sulfo, carboxyl or a group of the formula —SO$_2$—Y where Y has one of the meanings given above, $Z^1$ is alkanoyl of 2 to 5 carbon atoms, benzoyl, dichloro-1,3,5-triazin-6-yl or a group of the formula (a)

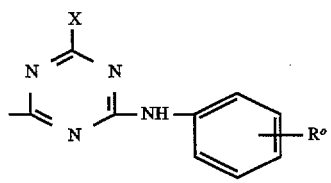

in which

X is chlorine or cyanamino and $R^o$ is sulfo, carboxyl or a group of the formula —SO$_2$—Y where Y has one of the meanings given above, $Z^2$ has one of the meanings of $Z^1$, and the group —NH—$Z^2$ in formula (5) is attached to the 6-sulfo-8-hydroxynaphth-2-yl in the 2 or 3 position.

2. A dye mixture as claimed in claim 1, wherein $R^1$, $R^3$, $R^5$, $R^7$ and $R^9$, independently of one another, are each methoxy or hydrogen and $R^2$, $R^4$, $R^6$, $R^8$ and $R^{10}$ are each hydrogen.

3. A dye mixture as claimed in claim 1, wherein the dyes of the formulae (1), (2), (3), (4) and (5) are present in the mixture in a molar mixing ratio of 10:1.3:1.8:8.6:1.2 to 10:0:0.8:3.5:0.

4. A dye mixture as claimed in claim 1, wherein the dyes of the formulae (1), (2), (3), (4) and (5) are present in the mixture in a molar mixing ratio of 10:1.25:1.55:7.4:0.95 to 10:0:1.05:5.0:0.

5. A dye mixture as claimed in claim 1, wherein each Y, independently of the others, is vinyl or β-sulfatoethyl.

6. A dye mixture as claimed in claim 1, wherein the dye mixture contains two or more dyes of the formula (3) in which in one or two of the dyes the radical R is sulfo and in the other dye(s) of the formula (3) the radical R is a group of the formula —$SO_2$—Y where Y has the meaning given in claim 1.

7. A dye mixture as claimed in claim 6, wherein the dye(s) of the formula (3) in which R is sulfo and the dye(s) of the formula (3) in which R is a group of the formula —$SO_2$—Y are present in a molar mixing ratio of 1:1.6 to 1:0.4.

8. A process for preparing a dye mixture as claimed in claim 1, which comprises mixing the individual dyes or mixtures of 2 or 3 of such individual dyes with the other individual dyes with one another in the form of their dye powders or aqueous solutions.

9. The process as claimed in claim 8 for preparing an aqueous solution of dye mixtures, wherein the aqueous solutions of the individual dyes or, if desired, the aqueous solutions of two or three of the individual dyes are mixed with one another in such a manner that the hue of the mixture is controlled during addition of the components by means of an ATR probe.

10. A method for dyeing hydroxyl- or carboxamido-containing fiber material or a hydroxyl/carboxamido fiber blend material comprising the step of contacting said material with a dye mixture as claimed in claim 1.

11. A process for dyeing hydroxyl- or carboxamido-containing fiber material or a hydroxyl/carboxamido fiber blend material, in which a dye or a mixture of dyes is applied to the material in dissolved form and the dye(s) are fixed on the material by means of heat or by reaction with an alkaline agent or both, which process comprises using, as the dyes, a dye mixture as claimed in claim 1.

* * * * *